United States Patent
Minamihara

(10) Patent No.: US 10,554,864 B2
(45) Date of Patent: Feb. 4, 2020

(54) DATA STRUCTURE, STORAGE DEVICE, SERVER, AND DATA GENERATING METHOD

(71) Applicant: SEIKO EPSON CORPORATION, Tokyo (JP)

(72) Inventor: Tetsuyuki Minamihara, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 25 days.

(21) Appl. No.: 15/799,752

(22) Filed: Oct. 31, 2017

(65) Prior Publication Data

US 2018/0131842 A1    May 10, 2018

(30) Foreign Application Priority Data

Nov. 9, 2016    (JP) ................. 2016-218649

(51) Int. Cl.
| | | |
|---|---|---|
| *H04N 1/60* | (2006.01) | |
| *H04N 1/32* | (2006.01) | |
| *H04N 1/00* | (2006.01) | |

(52) U.S. Cl.
CPC ....... *H04N 1/6094* (2013.01); *H04N 1/00344* (2013.01); *H04N 1/32122* (2013.01); *H04N 2201/3205* (2013.01); *H04N 2201/326* (2013.01); *H04N 2201/3228* (2013.01)

(58) Field of Classification Search
CPC ............ H04N 1/6094; H04N 1/00344; H04N 1/32122; H04N 1/6097; H04N 2201/3205; H04N 2201/3228; H04N 2201/326
USPC .................................... 358/1.9, 1.15
See application file for complete search history.

(56) References Cited

U.S. PATENT DOCUMENTS

2010/0097649 A1* 4/2010 Akiyama ............. G06F 3/1205
  358/1.15
2016/0080609 A1* 3/2016 Inada ................... H04N 1/6033
  358/1.9

FOREIGN PATENT DOCUMENTS

JP    2010-102398    5/2010

* cited by examiner

*Primary Examiner* — Quang N Vo
(74) *Attorney, Agent, or Firm* — Workman Nydegger

(57) ABSTRACT

Conditions corresponding to the type of print medium can be easily acquired when executing a printing process. A first area stores first information related to a print medium for each type of print medium. A second area stores second information, which is related to conditions used in a printing process generating print data and causing a printing mechanism to print on a print medium an image defined by the print data, relationally to first information corresponding to the type of print medium to be printed on in the printing process.

15 Claims, 8 Drawing Sheets

I

| BASIC SECTOR Rm | | EXTENSIBLE SECTOR Rp | | | |
|---|---|---|---|---|---|
| VENDOR | PHYSICAL CONFIGURATION | MANUFACTURER | MODEL | IMAGE PROCESSING INFORMATION Ip1 | PRINT SETTINGS INFORMATION Ip2 |
| VA | VA1 | PA | PA1 | Ip11 | Ip21 |
| | | | PA2 | ... | ... |
| | | | PA3 | ... | ... |
| | | PB | PB1 | ... | ... |
| | | | PB2 | ... | ... |
| | | ... | ... | ... | ... |
| | | ... | ... | ... | ... |
| VA | VA2 | PA | PA1 | ... | ... |
| | | | PA2 | ... | ... |
| | | | PA3 | ... | ... |
| | | PB | PB1 | ... | ... |
| | | | PB2 | ... | ... |
| | | ... | ... | ... | ... |
| | | ... | ... | ... | ... |
| VB | VB1 | PA | PA1 | ... | ... |
| | | | PA2 | ... | ... |
| | | | PA3 | ... | ... |
| | | PB | PB1 | ... | ... |
| | | | PB2 | ... | ... |
| | | ... | ... | ... | ... |
| | | ... | ... | ... | ... |
| VB | VB2 | PA | PA1 | ... | ... |
| | | | PA2 | ... | ... |
| | | | PA3 | ... | ... |
| | | PB | PB1 | ... | ... |
| | | | PB2 | ... | ... |
| | | ... | ... | ... | ... |
| | | ... | ... | ... | ... |
| ... | ... | ... | ... | ... | ... |

| PRINT MEDIA | | PRINTING MECHANISM | |
|---|---|---|---|
| VENDOR | PHYSICAL CONFIGURATION | MANUFACTURER | MODEL |
| VA | VA1 | PA | PA1 |
| | | | PA2 |
| | | | PA3 |
| | | PB | PB1 |
| | | | PB2 |
| | | ... | ... |
| | | ... | ... |
| VA | VA2 | PA | PA1 |
| | | | PA2 |
| | | | PA3 |
| | | PB | PB1 |
| | | | PB2 |
| | | ... | ... |
| | | ... | ... |
| VB | VB1 | PA | PA1 |
| | | | PA2 |
| | | | PA3 |
| | | PB | PB1 |
| | | | PB2 |
| | | ... | ... |
| | | ... | ... |
| VB | VB2 | PA | PA1 |
| | | | PA2 |
| | | | PA3 |
| | | PB | PB1 |
| | | | PB2 |
| | | ... | ... |
| | | ... | ... |
| ... | ... | ... | ... |
| | | | |

FIG. 5

| BASIC SECTOR Rm | | | EXTENSIBLE SECTOR Rp | | | |
|---|---|---|---|---|---|---|
| PRODUCT NUMBER N | VENDOR | PHYSICAL CONFIGURATION | MANUFACTURER | MODEL | IMAGE PROCESSING INFORMATION Ip1 | PRINT SETTINGS INFORMATION Ip2 |
| Na1 | VA | VA1 | PA | PA1 | Ip11 | Ip21 |
| | | | | PA2 | ... | ... |
| | | | | PA3 | ... | ... |
| | | | PB | PB1 | ... | ... |
| | | | | PB2 | ... | ... |
| | | | ... | ... | ... | ... |
| | | | ... | ... | ... | ... |
| Na2 | VA | VA2 | PA | PA1 | ... | ... |
| | | | | PA2 | ... | ... |
| | | | | PA3 | ... | ... |
| | | | PB | PB1 | ... | ... |
| | | | | PB2 | ... | ... |
| | | | ... | ... | ... | ... |
| | | | ... | ... | ... | ... |
| Nb1 | VB | VB1 | PA | PA1 | ... | ... |
| | | | | PA2 | ... | ... |
| | | | | PA3 | ... | ... |
| | | | PB | PB1 | ... | ... |
| | | | | PB2 | ... | ... |
| | | | ... | ... | ... | ... |
| | | | ... | ... | ... | ... |
| Nb2 | VB | VB2 | PA | PA1 | ... | ... |
| | | | | PA2 | ... | ... |
| | | | | PA3 | ... | ... |
| | | | PB | PB1 | ... | ... |
| | | | | PB2 | ... | ... |
| | | | ... | ... | ... | ... |
| | | | ... | ... | ... | ... |
| ... | ... | ... | ... | ... | ... | ... |

FIG. 7

DATA STRUCTURE, STORAGE DEVICE, SERVER, AND DATA GENERATING METHOD

CROSS-REFERENCE TO RELATED APPLICATIONS

The present application claims priority to Japanese Patent Application No. 2016-218649, filed Nov. 9, 2016, which is hereby incorporated by reference in its entirety.

BACKGROUND

1. Technical Field

The present invention relates to technology enabling executing a printing process that causes a printer to print images expressed by print data on print media using conditions corresponding to the type of print medium.

2. Related Art

Printing technology for generating print data representing an image to print, and enabling a printer to print the image on a print medium based on the print data, is known from the literature. In this event, there are many types of print media of different dimensions and materials, for example, that could be used for printing. Therefore, to print images desirably on a particular print medium, various conditions must be adjusted appropriately to the specific type of print medium used to print, such as the conditions used to generate the print data, and printing conditions set in the printer. To this end, JP-A-2004-205846 describes generating print data by applying color matching using the ICC (International Color Consortium) profile appropriate to the type of print medium.

However, a wide range of print media are now available from numerous vendors, and it is not simple for the printer user to know what conditions are appropriate for the specific type of print medium that will be used in the printing process. As a result, print quality may drop as a result of using inappropriate conditions to print on the print medium due to the difficulty optimizing the printing process appropriately to the type of print medium used.

SUMMARY

An objective of the invention is to provide technology enabling easily acquiring the conditions appropriate to the type of print medium when executing a printing process.

A data structure according to the invention includes a first area for storing first information related to print media for each media type of print medium; and a second area configured for storing second information relationally to the first information corresponding to the media type of the print medium to print on in a printing process, the second information being related to conditions used in a printing process that generates print data and causes a printing mechanism to print images expressed by the print data on the print medium.

A server according to the invention has a first area for storing first information related to print media for each media type of print medium; and a second area configured for storing second information relationally to the first information corresponding to the media type of the print medium to print on in a printing process, the second information being related to conditions used in a printing process that generates print data and causes a printing mechanism to print images expressed by the print data on the print medium; and stores a print medium file containing the first information and second information for each type of print medium.

A data generating method according to the invention includes: storing, for each media type of print medium, first information related to print media in a first area of the data structure; and storing, relationally to the first information corresponding to the media type of the print medium to print on in a printing process, second information related to conditions used in a printing process that generates print data and causes a printing mechanism to print images expressed by the print data on the print medium, in a second area of the data structure.

By the invention (data structure, storage device, data generating method) thus comprised, first information related to print media is stored for each type of print medium in a first area of the data structure. In a second area of the data structure, second information related to conditions used in a printing process is stored relationally to the first information corresponding to the media type of the print medium to print on. The conditions appropriate to the media type of the print medium can therefore be acquired by identifying in the first area of the data structure the first information related to the media type of the print medium to be used, and by identifying the related second information in the second area of the data structure. The conditions appropriate to the media type of the print medium can therefore be easily acquired when executing the printing process.

The data structure may be configured so that the first information includes information about the physical characteristics of the print medium of the corresponding media type.

This configuration enables easily acquiring conditions appropriate to the media type of the print medium by acquiring from the first area of the data structure the first information storing physical characteristics matching the print medium to use for printing, and acquiring the related second information from the second area of the data structure.

Further alternatively, the data structure may be configured so that the first information includes information about the vendor of the print medium of the corresponding type.

This configuration enables easily acquiring conditions appropriate to the media type of the print medium by acquiring from the first area of the data structure the first information matching the print medium to use for printing and the vendor, and acquiring the related second information from the second area of the data structure.

Further alternatively, the data structure may be configured so that the first information includes a media identification information for identifying the corresponding type of media, and the first information and second information for the same media type are related by the media identification information.

This configuration enables easily identifying the second information related to the first information by referencing the media identification information.

Further alternatively, the data structure may be configured so that the second area stores second information for each model of printing mechanism relationally to the first information for a single media type.

This configuration can relate to first information for one media type second information specific to multiple mutually different models of printing mechanisms. As a result, conditions appropriate to both the print medium and printing mechanism can be easily acquired by acquiring from the first area of the data structure the first information corresponding to the media type of a print medium, and acquiring from the multiple related instances of second information the second information related to the model of printing mechanism used in the printing process.

Further alternatively, the data structure may be configured so that the second information related to the first information for one media type is stored for each model of printing mechanism grouped by printing mechanism manufacturer.

This configuration enables easily acquiring conditions corresponding to a specific printing mechanism by acquiring from the second area the second information matching the printing mechanism to use for printing and the manufacturer of the printing mechanism.

Further alternatively, the data structure may be configured so that the second information includes image processing information used to generate print data appropriate to the media type corresponding to the related first information.

This configuration enables easily acquiring image processing information appropriate to the media type of the print medium, and using the image processing information to generate print data.

Further alternatively, the data structure may be configured so that the second information includes print settings information that is set for the printing mechanism appropriate to the media type corresponding to the related first information.

This configuration enables easily acquiring print settings information appropriate to the media type of the print medium, and using the print settings information to drive the printing mechanism to print.

Another aspect of the invention is a server that acquires second information in a second area based on first information in a first area in response to a request from an external device specifying a print medium, creates a print medium file containing the first information and second information, and sends the file to the device from which the request was received.

This configuration enables sending the appropriate print medium file to the requesting device.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows a first example of the data structure of media data stored on a media server.

FIG. 5 shows an example of a window for inputting a request for a printing profile.

FIG. 7 shows a second example of the data structure of media data stored on a media server.

DESCRIPTION OF EMBODIMENTS

Figure 1:
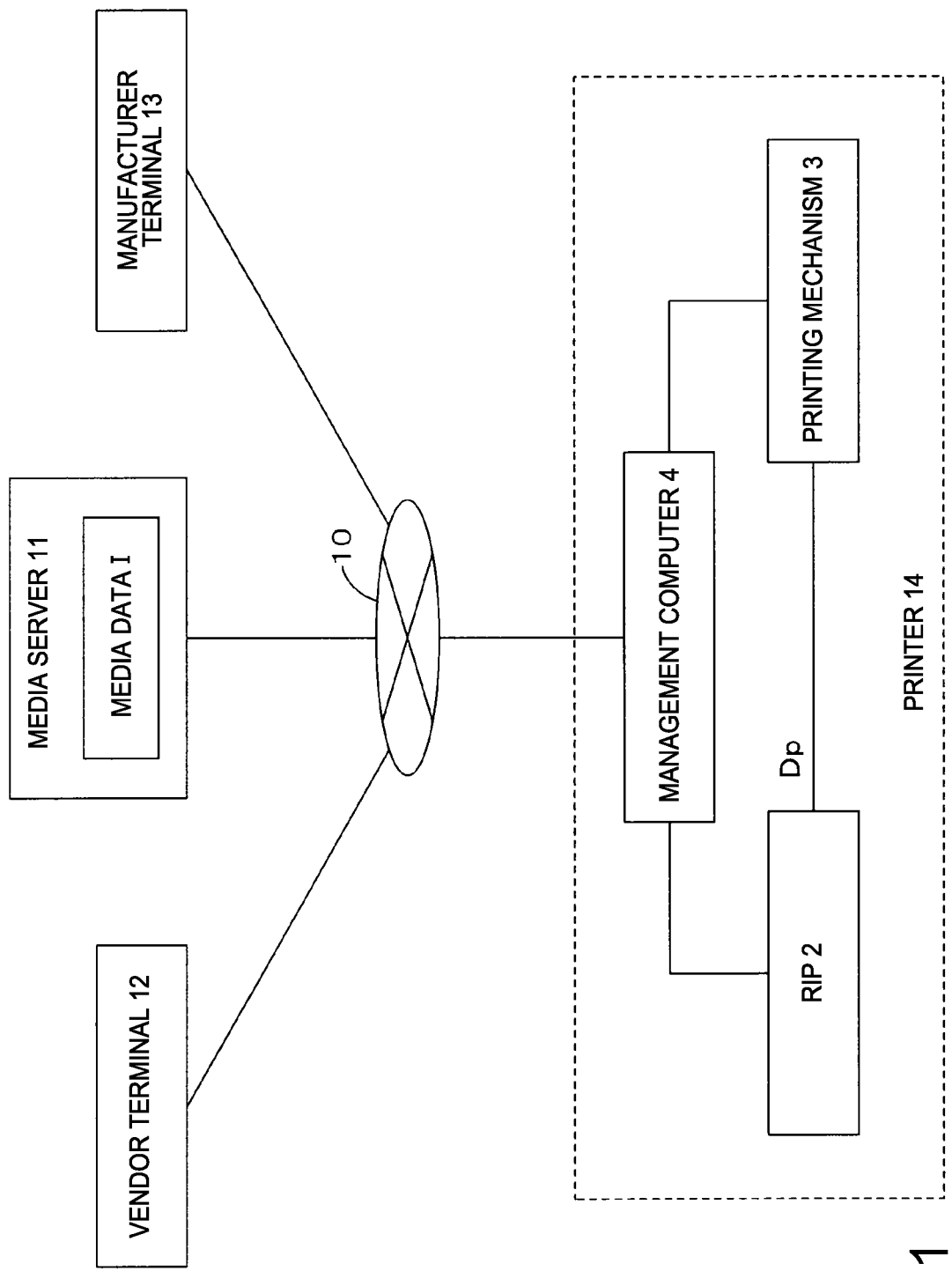
FIG. 1 is a block diagram illustrating a first example of a printing system according to the invention.

FIG. 1 is a block diagram illustrating a first example of a printing system according to the invention. The printing system 1 includes a media server 11, vendor terminal 12, manufacturer terminal 13, and printer 14 connected through the Internet 10.

The media server 11 is a computer that functions as a cloud server, and stores media data I containing information appropriate to specific types of print media. The media data I is described in detail below.

The vendor terminal 12 is a computer that is operated by a vendor supplying print media, and the vendor can use the vendor terminal 12 to write to the media data I.

The manufacturer terminal 13 is a computer operated by the manufacturer that supplies the printing mechanism 3 of the printer 14, and the manufacturer can use the manufacturer terminal 13 to write to the media data I.

The printing system 1 is a global printing system configured so that multiple printers 14 used in different local environments (such as the corporate computing environment of the particular user) can access the media server 11.

The printer 14 is a local printing system installed in the local environment of the user for executing printing processes. More specifically, the printer 14 includes a raster image processor (RIP) 2, printing mechanism 3, and management computer 4 that controls the RIP 2 and printing mechanism 3, and executes a printing process causing the RIP 2 to generate print data Dp and the printing mechanism 3 to print the image expressed by the print data Dp.

The RIP 2 applies a color management process using an ICC profile to the image data, and rasterizes the resulting image data to generate the print data Dp (raster data). The print data Dp thus generated is then sent from the RIP 2 to the printing mechanism 3. The printing mechanism 3 is a printer that prints an image corresponding to the print data Dp on print media, and may be configured as shown in FIG. 2, for example.

Figure 2:
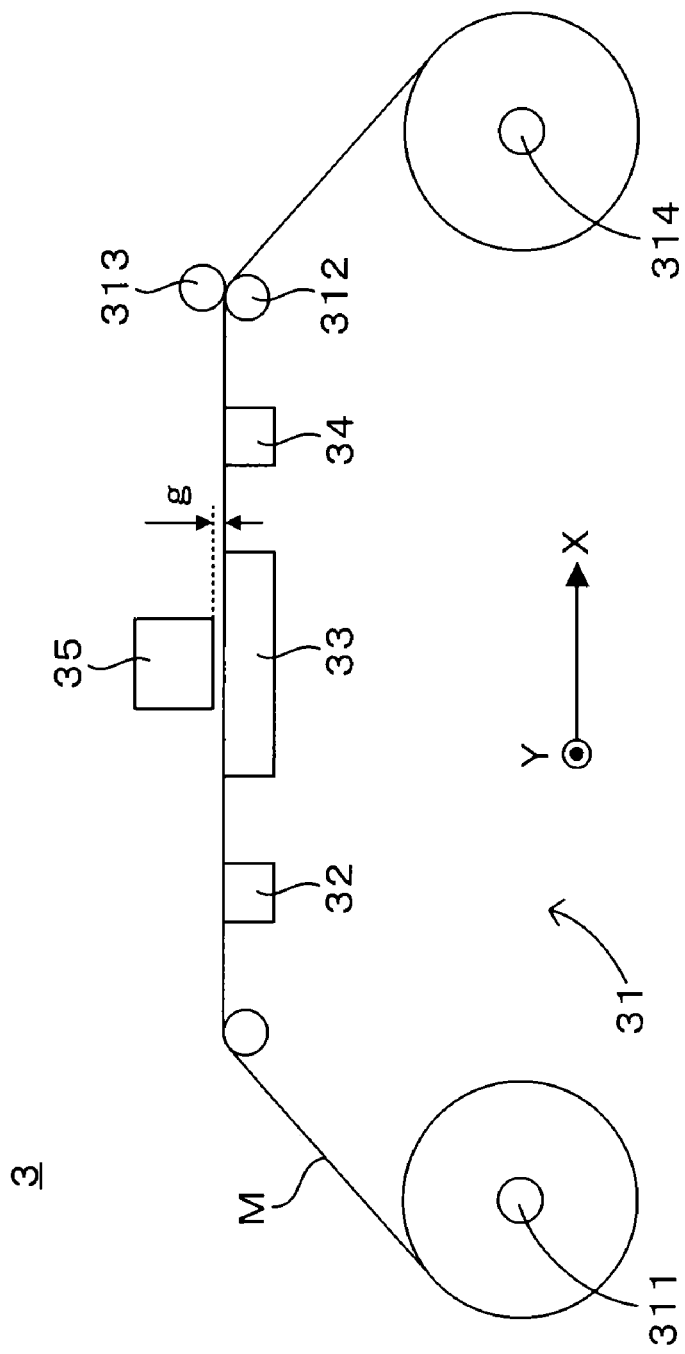
FIG. 2 schematically illustrates an example of a printer configuration.

FIG. 2 schematically illustrates an example of the configuration of the printing mechanism.

The printing mechanism 3 has a roll-to-roll conveyance mechanism 31 that conveys the print medium M in the conveyance direction X. This conveyance mechanism 31 includes sequentially in the conveyance direction X of the print medium M: a delivery roller 311, a pair of rollers 312, 313, and a take-up roller 314. The delivery roller 311 delivers the print medium M in the conveyance direction X from a paper roll. The pair of rollers 312, 313 hold the print medium M delivered by the delivery roller 311. One roller 313 is urged against the roller 312 to apply a constant load to the print medium M, and the roller 312 conveys the print medium M in the conveyance direction X while applying constant tension to the print medium M by applying specific torque to the print medium M. The take-up roller 314 then rewinds the print medium M conveyed from the pair of rollers 312, 313.

Between the delivery roller 311 and roller 312, the printing mechanism 3 has sequentially in the conveyance direction X a preheater 32, platen heater 33, and after heater 34, and heats the print medium M touching the tops of the heaters. The printing mechanism 3 also has a printhead 35 opposite the platen heater 33 with a specific gap g therebetween. The printhead 35 ejects ink using an inkjet printing method to the print medium M supported on the platen heater 33.

By the conveyance mechanism 31 intermittently conveying the print medium M in the conveyance direction X, the printing mechanism 3 advances an unprinted portion of the print medium M to the platen heater 33. The printhead 35 then executes a main scanning operation ejecting ink while moving in the scanning direction Y crosswise to the conveyance direction X. The number of passes the printhead 35 makes in the scanning direction Y can be desirably adjusted, and images are formed on the print medium M paused at the platen heater 33 by the printhead 35 executing the main scanning operation the specified number of sets. Furthermore, the drying time by the platen heater 33 of the ink that landed on the print medium M in the previous main scan is controlled by adjusting the interval between the multiple main scans.

Referring again to FIG. 1, the printer 14 controls the RIP 2 and printing mechanism 3 by the management computer 4. As described above, the printer 14 controls the RIP 2 and the printing mechanism 3 by the management computer 4. More particularly in this embodiment of the invention, the management computer 4 controls the operation of the RIP 2 and printing mechanism 3 according to the type of print medium M. More specifically, the ICC profile that should be used in the color management process executed by the RIP 2 differs according to the type of print medium M. The management computer 4 therefore sets the ICC profile in the RIP 2 appropriately to the type of print medium M set to be used in the printing process, and the RIP 2 then generates the print data Dp using the ICC profile that was set.

When printing by the printing mechanism 3, one or more machine parameters may change according to the type of print medium M. The machine parameters may include, for example, the tension on the print medium M, the load of the roller 313, the specific gap g, the number of passes in the main scanning direction, the interval between main scans, the interval between passes, the temperature of the preheater 32, the temperature of the platen heater 33, and the temperature of the after heater 34. The management computer 4 therefore sets the machine parameters in the printing mechanism 3 according to the type of print medium M scheduled to be used in the printing process, and the printing mechanism 3 prints using the set machine parameters.

The management computer 4 acquires media data I indicating the ICC profile and machine parameters appropriate to the type of print medium M from the media server 11 through the Internet 10.

The data structure of media data I stored on the media server 11 is described next.

FIG. 3 shows a first example of the data structure of media data stored by the media server. The data structure Is of the media data I includes a basic sector Rm and an extensible sector Rp. The basic sector Rm is used to store basic media information Im related to a specific print medium M for each media type Mk. The basic media information Im includes the vendor VA and the physical configuration VA1, VA2, and so forth of the print medium M of a specific media type Mk. If the media type Mk is different, the vendor VA, VB or the physical configuration VA1, VA2 in the basic media information Im is different. In other words, each media type Mk in the basic sector Rm is differentiated by the specific combination of vendor VA, VB and physical configuration VA1, VA2.

Note that the basic media information Im in this embodiment is written in XML (eXtensible Markup Language).

The physical configuration of the print medium M may include, for example, the length of the print medium M, the width of the print medium M, the thickness of the print medium M, the grammage of the print medium M, the material of the print medium M (such as paper, film, and laminates thereof), absorptivity of the print medium M, color of the print medium M, and whether or not there is adhesive on the print medium M.

The extensible sector Rp is used to store the printing profile Ip related to the conditions used in the printing process. In this example, the printing profile Ip includes image processing information Ip1, and print settings information Ip2. The image processing information Ip1 describes the image processing conditions, such as the ICC profile used to generate the print data Dp. The print settings information Ip2 describes the print settings conditions, such as the machine parameters used when the printing mechanism 3 prints the image expressed by the print data Dp. Data may be stored in the extensible sector Rp in various ways, such as storing the ICC profile as binary data, and the machine parameters as text data. The machine parameters may also be stored in a file format such as a CPB file, and the ICC profile may be stored in a file format such as an ICC file. A print medium file is embodied by the CPB file and ICC file.

More specifically, the extensible sector Rp stores a printing profile Ip related to the basic media information Im corresponding to the media type Mk of the print medium M processed in the printing process. The extensible sector Rp thus stores a printing profile Ip for each media type Mk. In addition, the extensible sector Rp can store multiple printing profiles Ip for the same media type Mk. The multiple printing profiles Ip related to the same media type Mk are for different models (types) of printing mechanisms 3. In other words, the extensible sector Rp can store a specific printing profile Ip for printing mechanism models PA1, PA2, and so forth. In this case, in the extensible sector Rp, the multiple printing profiles Ip related to the same media type Mk are stored in relation to the manufacturer PA, PB, and so forth of the specific printing mechanism 3.

The media data I thus defines the printing profile Ip to be used when a specific model of printing mechanism 3 prints to a print medium M of a specific media type Mk. For example, when printing with a printing mechanism 3 of model PA1 from manufacturer PA on a print medium M of media type Mk identified by the vendor VA and physical configuration VA1, the printing profile Ip containing image processing information Ip11 and print settings information Ip21 is applied.

The media data I is created jointly by the vendor of the print medium M and the manufacturer of the printing mechanism 3. More specifically, the print medium M vendor writes the basic media information Im for a print medium M sold by the vendor to the basic sector Rm. The manufacturer of the printing mechanism 3 then determines the optimal printing profile Ip to use when using the printing mechanism 3 to print on a print medium M of the media type Mk identified by the basic media information Im, and writes the printing profile Ip to the extensible sector Rp. A user printing with the printer 14 acquires the printing profile Ip corresponding to the type of print medium M to be used in the printing process Mk and the model of printing mechanism 3 from the media server 11.

Figure 4:
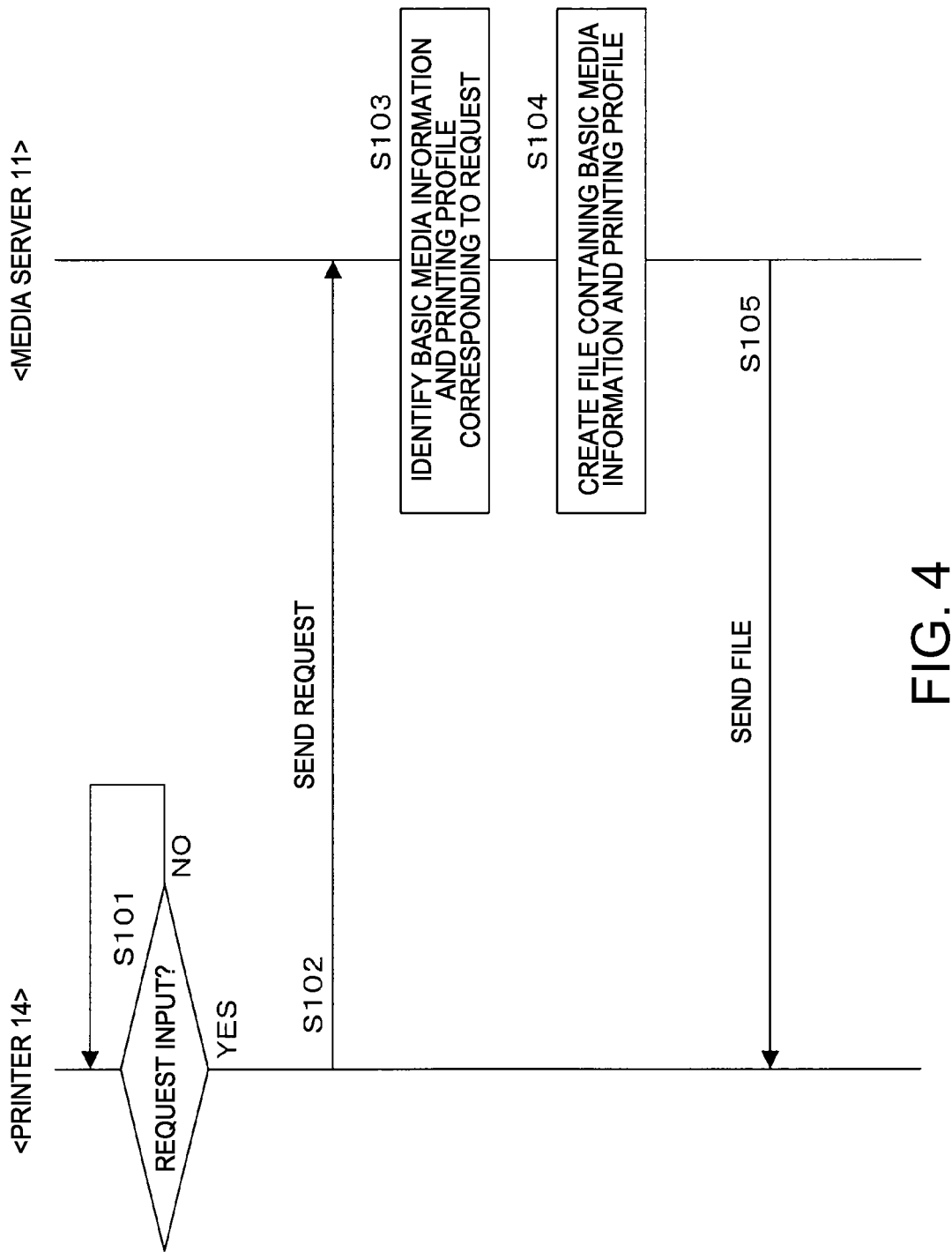
FIG. 4 shows an example of a process acquiring a printing profile from a media server.

FIG. 4 is a flow chart of the process for acquiring a printing profile from the media server. In step S101, the management computer 4 of the printer 14 determines if request input requesting acquiring a printing profile Ip was received through the user interface. The request input specifies the vendor and physical configuration of the print medium M, and the manufacturer and model of the printing mechanism 3. The request input may be input by the user inputting the information using a keyboard, or by the method shown in the next example in FIG. 5.

FIG. 5 shows an example of an interface for inputting a request for a printing profile. In this example, the input screen S in FIG. 5 is presented on the display of the management computer 4. In this input screen S, the physical configuration of multiple print media M of different media types Mk are grouped in a list by vendor, and the multiple models of printing mechanisms 3 associated with each media type Mk are grouped in a list by manufacturer. The user then inputs a request by using the cursor C (through a mouse or other pointing device) to select the model of printing mechanism 3 (model PB1 in the example in FIG. 5) related to the vendor and physical configuration of the print medium M to use in the printing process.

When input of a request is detected in step S101 in FIG. 4, a request signal containing the information specified in the request input is sent from the management computer 4 of the printer 14 to the media server 11 (step S102).

In step S103, the media server 11 identifies the basic media information Im matching the information in the request signal, and identifies the printing profile Ip matching the information in the request signal from among the multiple printing profiles Ip related to the basic media information Im that was identified. The media server 11 then generates a file containing the identified basic media information Im and printing profile Ip (step S104), and sends the file to the management computer 4 of the printer 14 (step S105).

This file may be formatted as a zip archive, for example. In this event, the file can be generated by compressing the XML file, CPB file, and ICC file in a zip format. The media server 11 then sends an appropriate print medium file to the printer 14 that sent the request, and the management computer 4 can acquire the printing profile Ip corresponding to the type of print medium M to be used in the printing process Mk and model of printing mechanism 3.

Figure 6:
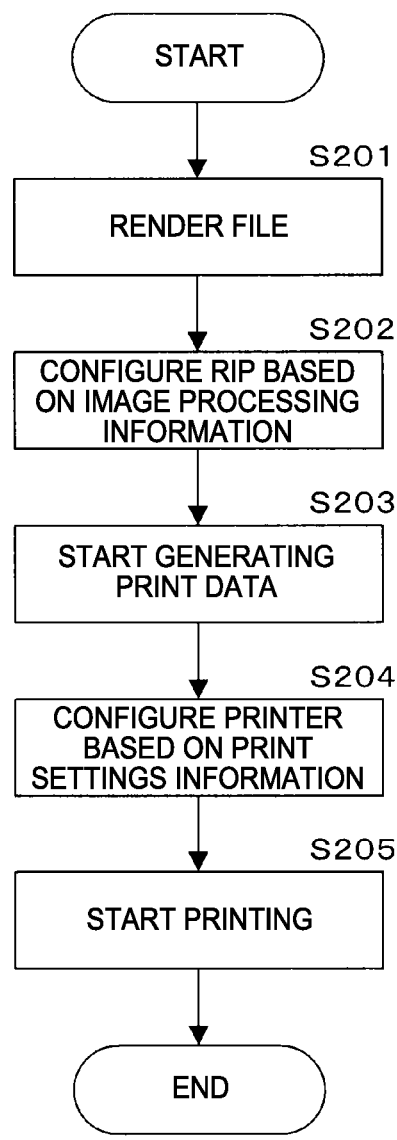
FIG. 6 is a flow chart of an example of a printing process executed by the printer.

FIG. 6 is a flow chart showing an example of a printing process executed by the printer. In step S201, the management computer 4 renders the file including the printing profile Ip. The management computer 4 then configures the RIP 2 according to the image processing information Ip1 contained in the printing profile Ip. As a result, the image processing information Ip1 (ICC profile) corresponding to the type of print medium M to be used in the printing process Mk is set in the RIP 2. The RIP 2 then starts generating the print data Dp using the image processing information Ip1 that was set (step S203). The management computer 4 also sets the print settings information Ip2 contained in the printing profile Ip in the printing mechanism 3 (step S204). As a result, print settings information Ip2 (machine parameters) corresponding to the type of print medium M to be used in the printing process Mk is set in the printing mechanism 3.

When the printing mechanism 3 then receives the print data Dp from the RIP 2, the printing mechanism 3 starts printing on the print medium M using the print settings information Ip2 that was set (step S205).

As described above, this embodiment of the invention stores basic media information Im related to a print medium M for each media type Mk of print medium M in the basic sector Rm of the data structure Is. A printing profile Ip related to conditions used in the printing process is stored in the extensible sector Rp of the data structure Is relationally to the basic media information Im corresponding to the media type Mk of the print medium M to print on. The conditions appropriate to the media type Mk of the print medium M can therefore be acquired by finding the basic media information Im corresponding to the media type Mk of the print medium M to print on in the basic sector Rm of the data structure Is, and finding the related printing profile Ip in the extensible sector Rp of the data structure Is. Conditions (the image processing conditions identified by the image processing information Ip1, or the printer settings identified by the print settings information Ip2) appropriate to the media type Mk of the print medium M can thus be easily acquired when executing the printing process.

The basic media information Im includes information indicating the physical configuration of the print medium M of the corresponding media type Mk. The conditions appropriate to the media type Mk of the print medium M can be easily acquired by finding in the basic sector Rm the basic media information Im with physical characteristics matching the print medium M to use for printing, and identifying from the extensible sector Rp of the data structure Is the printing profile Ip related to the extracted basic media information Im.

The basic media information Im includes information indicating the vendor of the print medium M of the corresponding media type Mk. The conditions appropriate to the media type Mk of the print medium M can therefore be easily acquired by finding in the basic sector Rm of the data structure Is the basic media information Im with the vendor matching the print medium M to use for printing, and finding in the extensible sector Rp of the data structure Is the printing profile Ip related to the basic media information Im.

The basic sector Rm is used to store a printing profile Ip for each model of printing mechanism 3 relationally to the basic media information Im of a particular media type Mk. Multiple printing profiles Ip corresponding to different models of printing mechanism. 3 can therefore be relationally stored to the basic media information Im of one media type Mk. Conditions corresponding to both the media type Mk of the print medium M and the model of the printing mechanism 3 can be easily acquired by finding in the basic sector Rm of the data structure Is the basic media information Im corresponding to the media type Mk of the print medium M, and acquiring the printing profile Ip corresponding to the model of printing mechanism 3 used in the printing process from among the multiple printing profiles Ip related to the basic media information Im.

The extensible sector Rp is used to store multiple printing profiles Ip related to the basic media information Im of one media type Mk for each model grouped by the manufacturer of the printing mechanism 3. Therefore, the conditions corresponding to a particular printing mechanism 3 can be easily acquired by acquiring from the extensible sector Rp the printing profile Ip matching the manufacturer and the printing mechanism 3 to use for printing.

The printing profile Ip includes image processing information Ip1 appropriate to the media type Mk corresponding to the related basic media information Im. Therefore, image processing information Ip1 corresponding to the media type Mk of the print medium M can be easily acquired and used to generate the print data Dp.

The extensible sector Rp also includes print settings information Ip2 that is set in the printing mechanism 3 according to the media type Mk corresponding to the related basic media information Im. Therefore, the print settings information Ip2 corresponding to the media type Mk of the print medium M can be easily acquired, and used to drive the printing mechanism 3 to print.

FIG. 7 shows another example of a data structure for media data stored on the media server. This data structure is described below with particular attention to the differences with the embodiment described above, common configurations are identified by like reference numerals, and further description is omitted or abbreviated. It will be obvious that the same effect will be achieved by using configurations common to the above embodiment.

The data structure Is shown in FIG. 7 includes a product number N of the media type Mk corresponding to the basic media information Im stored in the basic sector Rm, and relates a different product number N to each different media type Mk. In other words, in the basic sector Rm of this data structure Is, each media type Mk is identified by a product number N. The basic media information Im and printing profile Ip for the same media type Mk are also related by the product number N. This product number N is previously affixed by the vendor of the print medium M to the packaging of the print medium M or the core of the roll of the print medium M, for example.

Because the media data I has the data structure Is shown in FIG. 7, the product number N of the print medium M is shown instead of the vendor and physical configuration of the print medium M in the input screen S shown in FIG. 5. In the printing profile Ip acquisition process shown in FIG. 4, the user inputs a printing profile request by selecting with the cursor C the product number N assigned by the vendor (step S101). A request signal identifying the product number N of the print medium M and the manufacturer and model of the printing mechanism 3 is then sent from the management computer 4 of the printer 14 to the media server 11 (step S102).

In step S103, the media server 11 references the product number N in the request signal to find the basic media information Im containing the product number N, and finds, in the multiple printing profiles Ip related to the basic media information Im identified by the product number N, the printing profile Ip matching the manufacturer and model in the request signal. The media server 11 then generates a file containing the identified basic media information Im and printing profile Ip (step S104), and sends the file to the management computer 4 of the printer 14 (step S105).

In the example shown in FIG. 7, the basic media information Im includes a product number N identifying the corresponding media type Mk, and basic media information Im and printing profiles Ip for the corresponding media type Mk are related by the product number N. Therefore, by referencing the product number N of the print medium M, the printing profile Ip correlated to the basic media information Im can be easily identified.

In the embodiments described above, the data structure Is is an example of the data structure of the invention; the basic sector Rm is an example of a first area of the invention; the extensible sector Rp is an example of a second area of the invention; the basic media information Im is an example of first information of the invention; the printing profile Ip is an example of second information of the invention; the image processing information Ip1 is an example of a image processing information of the invention; print settings information Ip2 is an example of print settings information of the invention; a product number N is an example of media identification information of the invention; and the media server 11 is an example of a server of the invention.

The invention is not limited to the foregoing embodiments, and can be varied in many ways without departing from the scope of the invention. For example, the configuration of the printing system 1 may be changed as shown in FIG. 8.

Figure 8:
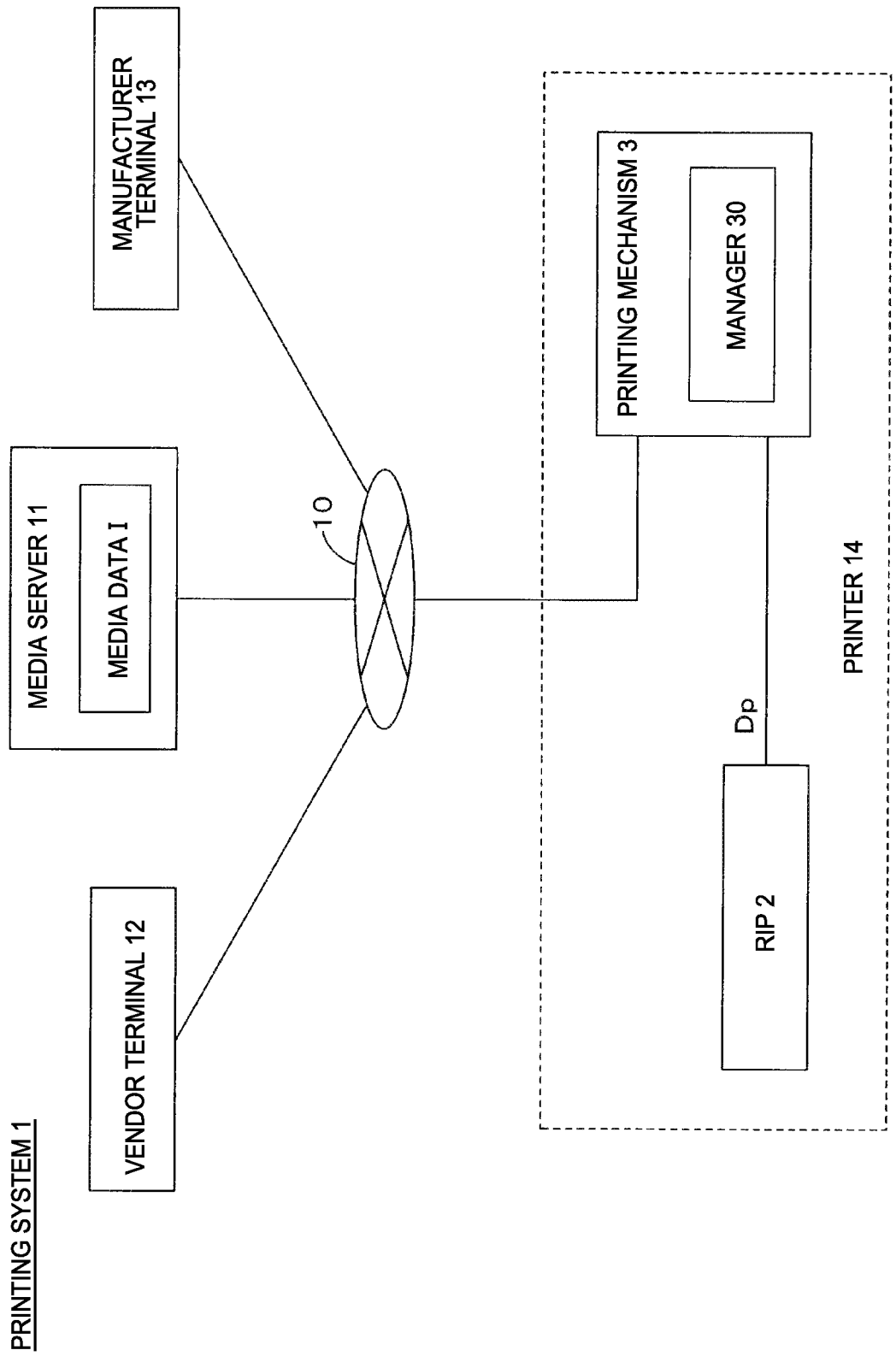
FIG. 8 is a block diagram illustrating a second example of a printing system according to the invention.

FIG. 8 is a block diagram of a second example of a printing system according to the invention. In the printing system 1 in FIG. 8, a manager 30, which is a computer comprising a CPU (central processing unit) and RAM (random access memory), is built into the printing mechanism 3. The manager 30 handles the function of the management computer 4 described above. In other words, the process of acquiring basic media information Im and printing profile Ip from the media server 11, the process of setting the image processing information Ip1 in the RIP 2, and the process of setting the print settings information Ip2 in the printing mechanism 3, are executed by the manager 30.

The information that can be included in the basic media information Im is also not limited to the foregoing. For example, the name of the print medium M, the model of the printing mechanism 3 suited to printing on the print medium M, a message from the vendor when using the print medium M, or information indicating when the basic media information Im was updated, may be included in the basic media information Im.

The example in FIG. 2 prints on the outside surface of the print medium M supplied in a roll, but configurations that print on the inside surface of the print medium M are conceivable. In this case, information indicating whether the inside surface or outside surface of the rolled print medium M is the printing surface may be included in the basic media information Im.

Furthermore, the basic media information Im is not limited to including information from the vendor of the print medium M, and information from the manufacturer of the printing mechanism 3 may be included in the basic media information Im. An example of such information is a message from the manufacturer when printing on the print medium M by a specific model of printing mechanism 3.

The information included in the image processing information Ip1 is also not limited to the foregoing. For example, when the print data Dp to be generated differs according to the number of passes, the number of passes (print mode) may be included in the image processing information Ip1. In addition, a color lookup table used for color conversions, the resolution of the printed image, or a table indicating the size of the ink droplets ejected for each dot, may also be included in the image processing information Ip1.

The information that can be included in the print settings information Ip2 is not limited to the foregoing. For example, when the printing mechanism 3 has a drying fan for drying the print medium M, the speed of the drying fan, for example, may be included in the print settings information Ip2. When the printing mechanism 3 is an inkjet printing mechanism, maintenance of the printhead 35 may be executed. More specifically, maintenance such as capping the nozzle face of the printhead 35 in which the ink ejection nozzles are formed with a cap, or vacuuming the nozzles by applying negative pressure to the nozzles while the nozzle face is capped, may be performed. Therefore, the frequency of maintenance, or the negative pressure applied (cleaning level) when vacuuming the nozzles, may be included in the print settings information Ip2.

Including all of the specific examples of basic media information Im described above in the basic media information Im is also not necessary, and a subset of this information may be included in the basic media information Im. The same applies to the image processing information Ip1 and print settings information Ip2.

In the example in FIG. 7, the product number N of the print medium M is an example of media identification information of the invention. However, the information that can be used as media identification information is not so limited. The name of the print medium M may therefore also be used as media identification information.

In step S104 in FIG. 4, the media server 11 creates and sends to the printer 14 a file containing both the basic media information Im and printing profile Ip. However, a configuration that sends only the printing profile Ip from the media server 11 to the printer 14 is also conceivable.

The number of printing mechanisms 3 in the printer 14 is also not limited to one, and multiple printing mechanisms 3 may be included. In this case, the management computer 4 may acquire a printing profile Ip for the media type Mk of the print medium M used by a particular printing mechanism 3. Multiple printing mechanisms 3 may be connected by a local area network in this case.

The printing mechanism 3 is also not limited to an inkjet printer, and may be a laser printer or other type of printer.

What is claimed is:

1. A non-transitory storage having stored thereon a data structure accessible by a plurality of printing mechanisms for generating print data, comprising:
   a first set of records configured to store for each media type first information, each of the first set of records identifying a type of print medium; and
   a second set of records configured to store, related to the first information, second information that differs according to each of the media types, each of the second set of records being used to generate print data and to print by a corresponding printing mechanism,
   wherein at least one of the second set of records includes an ICC profile of the corresponding printing mechanism,
   wherein at least one of the second set of records includes one or more predetermined values of one or more adjustable machine parameters of the corresponding printing mechanism,
   wherein the ICC profile is configured to be accessed by the corresponding printing mechanism and to cause the corresponding printing mechanism to use the ICC profile to generate print data, and
   wherein the data structure is configured to be accessed by each of the plurality of printing mechanisms to obtain the second information based on the first information identifying a particular type of print medium to generate print data for a print job that is to be printed on the particular type of media.

2. The non-transitory storage described in claim 1, wherein:
   the first set of records is stored grouped by the printing mechanism manufacturer and manufacturer model relationally to the first information grouped by media type.

3. The non-transitory storage described in claim 1, wherein:
   the first information includes information indicating the physical configuration of the print medium.

4. The non-transitory storage described in claim 1, wherein:
   the first information includes information indicating the vendor of the print medium.

5. The non-transitory storage described in claim 1, wherein:
   the second information includes image processing information that is dependent on the print medium and is used to generate print data.

6. The non-transitory storage described in claim 1, wherein:
   the second information includes print settings information that is set for a printing mechanism and depends on the print medium and printing mechanism model.

7. A server comprising:
   a first set of records configured to store for each media type first information identifying a print medium; and
   a second set of records configured to store relationally to the first information second information that differs according to the media type and is used to generate print data and to print by a printing mechanism;
   the first and second sets of records storing the second information relationally to the first information for each model of printing mechanism,
   at least one of the second set of records including an ICC profile of the corresponding printing mechanism, and
   at least one of the second set of records including one or more predetermined values of one or more adjustable machine parameters of the corresponding printing mechanism.

8. The server described in claim 7, further comprising:
   in response to a request identifying a print medium and printing mechanism model, identifying a record in the first set of records related to the print medium, and then identifying a record in the second set of records based on the printing mechanism model.

9. A printing system comprising:
   a server configured to relationally store to a first set of records including each type of print medium first information related to the print medium and a second set of records including second information related to a condition used in a printing process of each of a plurality of printers at least one of the second set of records including at least one of the following: (1) one or more predetermined values of one or more adjustable machine parameters of the corresponding printing mechanism, and (2) an ICC profile of the corresponding printing mechanism; and
   at least one of the plurality of printers configured to print images on print media;
   the server sending to the at least one printer the second information related to the first information corresponding to the type of print medium used by the at least one printer to print; and
   the at least one printer printing by a printing mechanism, the at least one printer being configured to set the one or more adjustable machine parameters of the printing mechanism based on the one or more predetermined values included in the second information received from the server, and being configured to use the ICC profile to generate print data.

10. The printing system described in claim 9, wherein:
    the first information includes information indicating the physical configuration of the print medium; and
    the server creates a file containing the second information related to the first information containing physical characteristics matching the print medium the printer is to use for printing, and the first information, and sends the file to the printer.

11. The printing system described in claim 9, wherein:
    the second information includes image processing information used to generate print data appropriate to the media type corresponding to the related first information; and
    the printer receives the print data generated from the image processing information and executes a printing process.

12. The printing system described in claim 9, wherein:
    the second information includes print settings information that is identified according to the media type corresponding to the related first information, and according to the specified printing mechanism; and the printer sets the print settings information contained in the second information received from the server in the printing mechanism to execute the printing process.

13. The printing system described in claim 9, wherein: the printer includes a management computer that manages the printing mechanism, the management computer acquiring the second information from the server and configuring the printing mechanism based on the second information.

14. The printing system described in claim 13, wherein: the management computer is housed in a separate case from the printing mechanism.

15. The printing system described in claim 13, wherein: the management computer is housed in the same case as the printing mechanism.

* * * * *